(12) United States Patent
Gullin

(10) Patent No.: US 9,454,561 B2
(45) Date of Patent: Sep. 27, 2016

(54) METHOD AND A CONSISTENCY CHECKER FOR FINDING DATA INCONSISTENCIES IN A DATA REPOSITORY

(75) Inventor: Patrick Gullin, Karlskrona (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/407,482

(22) PCT Filed: Jun. 15, 2012

(86) PCT No.: PCT/SE2012/050659
§ 371 (c)(1),
(2), (4) Date: Dec. 12, 2014

(87) PCT Pub. No.: WO2013/187816
PCT Pub. Date: Dec. 19, 2013

(65) Prior Publication Data
US 2015/0169669 A1    Jun. 18, 2015

(51) Int. Cl.
*G06F 17/30* (2006.01)
*G06N 5/02* (2006.01)
*G06N 7/00* (2006.01)

(52) U.S. Cl.
CPC ... *G06F 17/30371* (2013.01); *G06F 17/30303* (2013.01); *G06F 17/30578* (2013.01); *G06N 5/027* (2013.01); *G06N 7/005* (2013.01)

(58) Field of Classification Search
CPC .................. G06F 17/30578; G06F 17/30303; G06F 17/30371
USPC ........................................................ 707/690
See application file for complete search history.

(56) References Cited

U.S. PATENT DOCUMENTS

| | | | | |
|---|---|---|---|---|
| 7,716,068 B2 * | 5/2010 | Ball | ...................... | G06F 19/326 600/300 |
| 7,908,249 B1 | 3/2011 | Gupta et al. | | |
| 8,918,677 B1 * | 12/2014 | Marokhovsky | ......... | G06F 11/16 707/687 |
| 2004/0034699 A1 * | 2/2004 | Gotz | ...................... | H04L 12/24 709/223 |
| 2007/0067278 A1 * | 3/2007 | Borodziewicz | ... | G06F 17/30675 |
| 2007/0282824 A1 * | 12/2007 | Ellingsworth | .... | G06F 17/30616 |
| 2009/0244290 A1 * | 10/2009 | McKelvey | ............. | H04N 7/173 348/181 |
| 2010/0257149 A1 * | 10/2010 | Cognigni | .......... | G06F 17/30575 707/698 |
| 2011/0138312 A1 * | 6/2011 | Yeh | ................... | G06F 17/30539 715/771 |
| 2014/0074731 A1 * | 3/2014 | Lande | .............. | G06Q 10/06395 705/306 |
| 2014/0089310 A1 * | 3/2014 | Myers | ................. | G06F 17/3071 707/737 |

FOREIGN PATENT DOCUMENTS

| | | |
|---|---|---|
| EP | 1258814 A1 | 11/2002 |
| WO | 2007098817 A1 | 9/2007 |

* cited by examiner

*Primary Examiner* — Joshua Bullock
(74) *Attorney, Agent, or Firm* — Patent Portfolio Builders, PLLC

(57) ABSTRACT

A consistency checker and (200) a method performed by a consistency checker (200) for finding inconsistencies of data posts stored in a data repository (220) is provided. The consistency checker (200) has a storage unit (202) in which a number of inconsistency patterns are stored, each inconsistency pattern being associated with an inconsistency analysis rule for a value of a data attribute. The consistency checker further has a receiving unit (204) for receiving a data post from the data repository, and a logic unit (206) arranged for matching a value of at least one data attribute of the data post with a value of the corresponding data attribute of the stored inconsistency patterns, and if there is a match, applying the inconsistency analysis rule that is connected with the matched inconsistency pattern to the data post to evaluate whether there is an inconsistency in the data post or not, wherein the number of inconsistency patterns each defines an inconsistency that has previously occurred for a value of a data attribute in the data repository.

15 Claims, 3 Drawing Sheets

| Soc Security Nr | Name | Age | Nationality | Gender |
|---|---|---|---|---|
| 123456987 | Jon Smith | 42 | English | Male |
| 987654321 | Bob Jackson | 29 | English | Male |
| 700501-1179 | Maria Svensson | 40 | Swedish | Female |
| 750106-9772 | Johan Johansson | 35 | Swedish | Male |
| 555444333 | Ben Johnsson | 53 | American | Male |

Fig. 2

Data repository A

| Employer ID | Name | Department | Role |
|---|---|---|---|
| AX_001 | Mary Jones | Production | Engineer |
| AD_003 | Bob Jackson | Economy | Manager |
| AX_005 | John Smith | Support | Administrator |

Data repository B

| Empl_ID | Salary | Bonus level | Tax |
|---|---|---|---|
| AX_001 | $6500 | 4% | $1500 |
| AD_003 | $7500 | 4% | $1800 |
| AX_005 | $4500 | 2% | $1100 |

Fig. 3

METHOD AND A CONSISTENCY CHECKER FOR FINDING DATA INCONSISTENCIES IN A DATA REPOSITORY

TECHNICAL FIELD

The present disclosure relates generally to a method and a consistency checker for finding data inconsistencies in a data repository.

BACKGROUND

It is a well known problem in the computer domain today that data saved in data repositories may be inconsistent. In theory, all data in all data sources should be normalized. Although, in reality this is not the case. The same data may be saved in many places, in one and the same repository or in different repositories. If for example two data posts should be equal but one of them is wrongly entered, these data posts are inconsistent. In another example two data posts have initially equal value(s). If later on, one of the data posts is updated but the other is not, the data in these two data posts have become inconsistent. That data is inconsistent could mean that at least two data posts contradict each other. Also lack of data could be considered as an inconsistency.

To keep control of data inconsistencies, specific data analyzing tools are used to detect potential inconsistencies. Although, to search for and detect data inconsistencies may take a long time and may consume lots of computing resources.

For example, large mobile operators have data about their subscribers stored in a Home Location register (HLR). If such subscriber data from a large mobile operator is to be exported to a data sheet such as a Microsoft® Excel sheet, the sheet may be approximately 150 to 200 columns wide and as much as 100,000,000 rows deep. In order to detect all possible inconsistencies, all 100,000,000 rows must be analyzed by a data analyzing tool. It goes without saying that such an analysis may become quite heavy from a processing point of view. In the domain of mobile telephony, a redundancy control is often performed between a primary HLR and a secondary HLR to detect inconsistencies, such as redundancies and possible changes in data that may occur when e.g. performing a backup between the primary and the secondary HLR. Such inconsistencies may be changes in the primary HLR that has not been replicated to the secondary HLR. In such a redundancy control, all columns must be verified which could mean 15,000,000,000-20,000,000,000 comparisons. Of course, such a redundancy control takes a long time and requires lots of computing resources. In another, even more interesting example, there are many criteria that have to be fulfilled for knowing if there is an inconsistency, for example when data attributes in a data post are related to each other. In such cases there are also lots of comparisons that have to be performed, which uses much computing resources. Consequently, there is a need to perform inconsistency analyses faster and by using less computing resources.

SUMMARY

It is an object of the invention to address at least some of the problems and issues outlined above. More specifically, it is an object to be able to perform data inconsistency analyses faster and with less computing resources compared to existing solutions.

The solution according to the present invention may focus on finding inconsistent data caused by systematic faults, such as faulty systems or incorrect instructions.

According to a first aspect, a method performed by a consistency checker is provided for finding inconsistencies of data posts stored in a data repository. The consistency checker has access to a number of inconsistency patterns, each inconsistency pattern being associated with an inconsistency analysis rule for a value of a data attribute. The method comprises: receiving a data post from the data repository, matching a value of a data attribute of the data post with a value of a corresponding data attribute of the stored inconsistency patterns, and, if there is a match, applying the inconsistency analysis rule that is connected with the matched inconsistency pattern to the data post to evaluate whether there is an inconsistency in the data post or not, wherein the number of inconsistency patterns each defines an inconsistency that has previously occurred for a value of a data attribute in the data repository.

By such a method, the accuracy in finding inconsistent data becomes higher compared to prior art methods. In other words, by this method for finding inconsistent data, a higher percentage of inconsistent data are found early in the process. Consequently, a better inconsistency finding result is achieved. Since the number of inconsistency patterns each defines inconsistencies that have previously occurred, inconsistency will be efficiently found. Consequently, a higher number of inconsistencies can be found on a shorter time than with conventional technology.

A data repository is any entity that holds data such as data base or a document etc. Examples of data repositories are a relation database accessed via Structured Query Language (SQL) or a directory service accessed via Lightweight Directory Access Protocol (LDAP). Other examples are a Microsoft® Excel file, a Comma Separated Values (CSV) file or an Extended Markup Language (XML) file.

A data post may be a row in an SQL database table, a row in a Microsoft® Excel file or a row in a CSV file.

A data attribute may be a part of a data post, or a column in an SQL database table, a column in an Excel sheet, a column in a CSV file, or an attribute in an LDAP tree.

An inconsistency analysis rule may be a definition of how data values of data attributes relate to each other.

With the term "a data post" could be meant one or more data posts. With the term "a data repository" could be meant one or more data repositories. The term "a data attribute" could mean one or more data attributes.

According to a second aspect, a consistency checker is provided for finding inconsistencies of data posts stored in at least one data repository. The consistency checker comprises: a storage unit in which a number of inconsistency patterns are stored, each inconsistency pattern being associated with an inconsistency analysis rule for a value of a data attribute and a receiving unit for receiving a data post from the data repository. The consistency checker further comprises a logic unit arranged for matching a value of at least one data attribute of the data post with a value of the corresponding data attribute of the stored inconsistency patterns, and, if there is a match, applying the inconsistency analysis rule that is connected with the matched inconsistency pattern to the data post to evaluate whether there is an inconsistency in the data post or not, wherein the number of inconsistency patterns each defines an inconsistency that has previously occurred for a value of a data attribute in the data repository.

According to a third aspect, a computer program product is provided, comprising computer readable code means, which when run in a computer causes the computer to perform the corresponding method according to the first aspect. The computer may be arranged in a consistency checker according to the second aspect. More specifically, the computer may be the logic unit of the consistency checker.

According to a fourth aspect, a computer program is provided, comprising computer readable code means, which when run in computer causes the computer to perform the corresponding method according to the first aspect.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which:

FIG. 2 is a table of a data repository for which the method according to FIG. 1 may be applied.

FIG. 3 illustrates two tables of a data repository each for which the method according to FIG. 1 may be applied.

DETAILED DESCRIPTION

Figure 1:
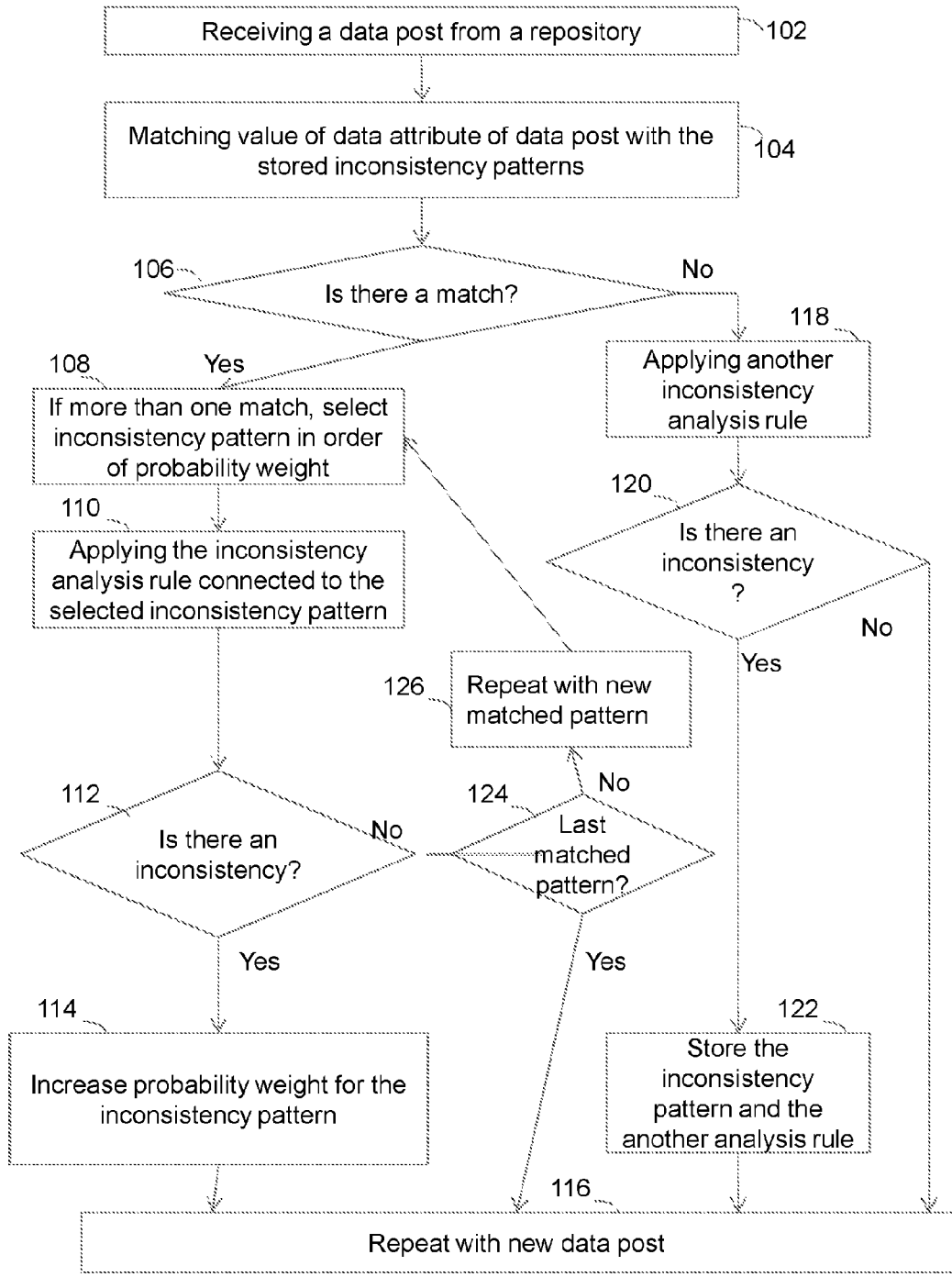
FIG. 1 is a flow chart illustrating a method according to an embodiment.

Since searching for inconsistencies in large data repositories both takes long time and requires a lot of computer resources, the possibilities to do a large inconsistency analysis is limited.

If an inconsistency analysis could be performed faster and with less computer recourses, the inconsistency analysis can be performed more frequent for the same data. If more frequent inconsistency analysis is done, the need for 100% accuracy is not always needed, since next analysis probably will find the majority of the missed inconsistencies in the previous analysis.

It would be easy to just randomly analyze a limited set of data with a limited set of rules, but that will only give a prediction of the inconsistency rate. It will only find inconsistencies from the randomly picked data. Thus, the accuracy will not be higher than the part of analyzed data. The reason to this problem is that the accuracy of finding inconsistencies is linear to the analyzed data. So if 30% of the data is analyzed, only 30% of the inconsistent data is found. E.g. finding 70% of inconsistent data can often be good enough, but with a random analysis this means that 70% of the data must be analyzed, and 70% may for many data repositories take too long time and require too much data processing capacity.

Briefly described, a solution is provided that influences the randomly picked data so that the probability of finding inconsistent data is increased. Thereby, the accuracy of finding inconsistencies will be larger than the analyzed part of the data source(s).

Briefly, this solution may be a method in a consistency checker for finding inconsistencies in data posts stored in data repositories, the method comprising receiving a data post from a data repository, and matching a value of a data attribute or values of data attributes of the data post with stored inconsistency patterns. Further, if there is a match, an inconsistency analysis rule connected to the matched inconsistency pattern is applied to evaluate whether there is an inconsistency in the data post or not. The stored inconsistency patterns may define inconsistencies that have previously occurred for a value of a data attribute in the data repository.

The method is particularly advantageous for improving accuracy in finding inconsistencies caused by faulty systems or instructions (such as user manuals etc.). Such causes may cause large data inconsistencies.

This may be achieved by in the consistency checker learn what kind of consistencies that are relevant to look for, by memorizing related data as a pattern for a found inconsistency. Next time a data post will be analyzed, the consistency checker will first check if the values of the data attributes of the data post match any previously found inconsistency pattern. If so, the inconsistency rule that detected the previously found inconsistency will be used instead of any randomly picked rule. In an embodiment, the found inconsistency that has the highest number of previously found inconsistencies will be analyzed first. By selecting the consistency rule that most likely has found inconsistencies based on the values of the data attributes of the previously analyzed data posts, the probability of finding inconsistencies is increased.

FIG. 1 shows a method in a consistency checker for finding inconsistencies of data posts stored in data repositories. The consistency checker has access to a number of inconsistency patterns, each inconsistency pattern being connected with an inconsistency analysis rule for a certain value of at least one data attribute. According to the method, a data post is received 102 from a data repository. Thereafter, a value of a data attribute of the data post is matched 104 with a value of a corresponding data attribute of the number of inconsistency patterns. If there is a match 106, i.e. if the value of the data attribute of the data post corresponds to, e.g. is the same as, the value of the corresponding data attribute of any of the number of inconsistency patterns, the inconsistency analysis rule connected to the matched inconsistency pattern is applied 110. If there is an inconsistency found 112, this inconsistency is marked as an inconsistency for further correction by a correction method, which is out of the scope of this disclosure. The result of the inconsistency analysis, comprising found inconsistencies, may be an inconsistency report.

According to an embodiment, if there is an inconsistency found 112 a probability weight for the inconsistency pattern may be increased 114. Thereafter, the method is repeated 116 with a new data post. The probability weight is a value indicating the frequency of this inconsistency pattern being true. I.e. the more often there has been an inconsistency for this inconsistency pattern, the higher the probability weight. The probability weight may be used in step 108, which says that if there is more than one match when matching values of data attributes of the data post with values of corresponding data attributes of the number of stored inconsistency patterns, the inconsistency pattern with the highest probability weight is selected 108.

Further, according to an embodiment, if there is no inconsistency detected 112 and it was the last matched pattern 124, the method may be repeated 116 from the beginning with a new data post. Alternatively, if there is no inconsistency detected 112 and there are other matched patterns with a probability weight lower than the last applied probability weight, the step 108 is repeated 126 with a new pattern, the new inconsistency pattern that is selected 108 being the next pattern in probability weight order. Alternatively, if there is no inconsistency detected 112 and there are other matched patterns with a probability weight lower than the last applied probability weight, those patterns may be skipped and the method may be repeated 116 with a new data post.

According to another embodiment, after matching values of data attributes of the data post with values of the corresponding data attributes of the stored inconsistency patterns 104, and there is no match found 106, another inconsistency analysis rule may be applied 118. This another inconsistency analysis rule may be e.g. a random inconsistency analysis rule. If there is an inconsistency found 120 when applying this another rule, the another inconsistency analysis rule is stored 122 such that the inconsistency checker has access to the rule. The another inconsistency analysis rule is stored 122 together with the inconsistency pattern for a certain value of a certain data attribute.

The method is now to be illustrated with an example, which only comprises one rule and a very small data source, which is shown in FIG. 2. The data repository comprises the data attributes Social Security Number (SSN), Name, Age, Nationality and Gender. The data repository has five data posts, each data post being a row in the table, e.g. the first row with the data attribute SSN having value 123456987, the data attribute Name having value Jon Smith, the data attribute Age having value 42, the data attribute Nationality having value English and the data attribute Gender having value Male.

For Swedish SSNs there is a relation between the SSN, Gender, and of course Nationality. The ninth digit (****-X*) of the SSN tells if the person is a male or a female. An odd ninth digit tells that the SSN belongs to a man and an even ninth digit to a woman. This may be called the Swedish Gender consistency rule (or inconsistency rule). If we look at the data repository of FIG. 2 we can see that there is an inconsistency for Maria Svensson. Although, it is impossible to tell if the $9^{th}$ digit 7 of the SSN is wrong or if the Gender Female is wrong.

Based on this knowledge and earlier found inconsistencies in the system we may already have an inconsistency pattern related to for example the Data attribute SSN having value "7" as its $9^{th}$ digit and value "Swedish" for data attribute Nationality stored. Consequently, when performing the method according to FIG. 1 for the data posts in the data repository of FIG. 2, a data post is firstly received 102, for example the first data post (John Smith etc.). Thereafter, the value of the $9^{th}$ digit of the data attribute SSN, and the value of data attribute Nationality of the first data post, are matched 104 with the stored inconsistency pattern, i.e. to see if the values of the data attribute of the first data post match the values of the inconsistency pattern. In this case, "John Smith" SSN=******-*7* but Nationality=English. Since Nationality is not matched the pattern is not matched. Thereafter, another inconsistency rule may be applied 118. Since there is only one rule in this case, the method is repeated 116 for another data post. Once the third data post (Maria Svensson) is received 102 there will be a match 106 since for the third data post the value of data attribute Nationality is Swedish and the value of data attribute SSN=******-*7*. Consequently, the Swedish Gender consistency rule will be applied 110. Since the Swedish Gender consistency rule shows that there is an inconsistency (a Swedish Woman cannot have a $9^{th}$ digit in her SSN that is 7), there is an inconsistency noted. Further, the probability weight for this inconsistency pattern may be increased 114.

As next data post, the $4^{th}$ data post (Johan Johansson) may be received 102. When matching the values of the data attributes SSN and Nationality with the values of corresponding data attributes of the inconsistency pattern stored, there is a match; Nationality is Swedish and the $9^{th}$ digit is 7. The Swedish Gender consistency rule is applied, but there is no inconsistency 112. (A Swedish man can have the $9^{th}$ digit 7 in his SSN.)

Another example when the method of the invention may be used is when two data repositories are used. The data repositories can both contain data based on the same model (e.g. when comparing redundant data repositories) or different data models. The example of FIG. 3 shows two different data models, comprising a data repository A and a data repository B. Data repository A comprises data attributes Employer ID, Name, Department and Role. The data attribute Role for example comprises values Engineer, Manager and Administrator. The first data post comprises values AX_001, Mary Jones, Production and Engineer. Data repository B comprises data attributes Empl_ID, Salary, Bonus level and Tax. The data attribute Bonus level for example comprises values 4%, 2%, 4%. The first data post comprises values AX_001, $6500, 4% and $1500. Let us say that there is a Manager Bonus consistency rule that says that Mangers should have 6% bonus every year. By analyzing both data repositories, it can be found that manager Bob Jackson does not have the right bonus. We may now have a stored inconsistency pattern from an earlier inconsistency for e.g. the data attribute values Bonus level: 4% and Role: Manager. If any of these data attribute values are true for a data post, there is a match with the stored inconsistency pattern and the Manager Bonus consistency rule is applied. Since there are now two data sources there must be a data source identifier included in the pattern.

Figure 4:
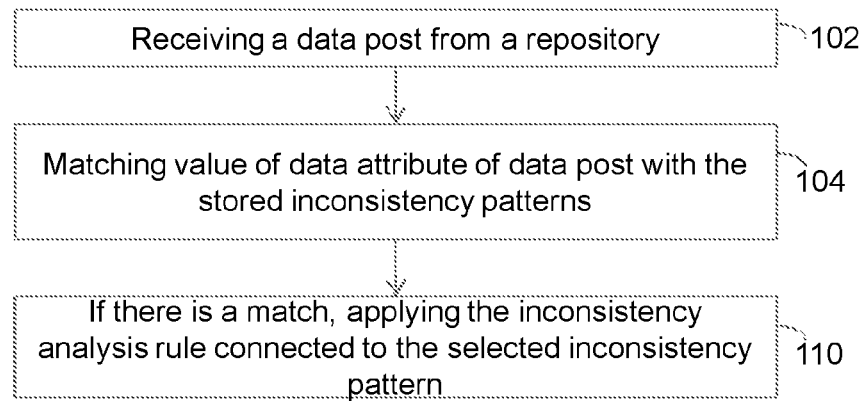
FIG. 4 is a flow chart illustrating a method according to another possible embodiment.

FIG. 4 shows a method performed by a consistency checker for finding inconsistencies of data posts stored in a data repository. The consistency checker has access to a number of inconsistency patterns, each inconsistency pattern being connected with an inconsistency analysis rule for a value of a data attribute. The method comprises: receiving 102 a data post from the data repository and matching 104 a value of a data attribute of the data post with the value of a corresponding data attribute of the stored inconsistency patterns. Further, if there is a match, the inconsistency analysis rule that is connected with the matched inconsistency pattern is applied 110 to the data post to evaluate whether there is an inconsistency in the data post or not, wherein the number of inconsistency patterns each defines an inconsistency that has previously occurred for the value of the data attribute in the data repository.

With reference again to FIG. 1, a number of alternative embodiments will be described below.

According to an embodiment, each of the number of inconsistency patterns has a probability weight, which probability weight is based on a frequency that the inconsistency of the inconsistency pattern has occurred for data posts in the data repository. The method further comprises, if there is more than one match, selecting 108 inconsistency pattern in an inconsistency pattern order according to the probability weight for each matched inconsistency pattern. By selecting inconsistency patterns among the matched patterns in an order that is based on earlier probabilities for inconsistencies occurring for a pattern, it is a higher probability that an inconsistency will be found among the first checked patterns than in later checked patterns. Consequently, the probability of finding an inconsistency early is improved even more.

According to another embodiment, each of the number of inconsistency patterns has a probability weight, which probability weight is based on a frequency that the inconsistency of the inconsistency pattern has occurred for data posts in the data repository. The method further comprises, if the applied inconsistency analysis rule showed that there is 112 an inconsistency for the data post, increasing 114 the probability weight of the inconsistency pattern connected to the applied inconsistency analysis rule. By updating probability weights when going through data posts in the data repository, the probability weight is updated such that the most frequently occurring inconsistency patterns are always checked first. Consequently, the probability of finding an inconsistency early is further improved.

According to yet another embodiment, the method comprises, if no match 106 is found, applying 118 another inconsistency analysis rule. The another inconsistency analysis rule may be a rule connected to another inconsistency pattern or a rule that is not connected to any inconsistency pattern. The another inconsistency analysis rule may be a randomly selected inconsistency analysis rule. Further, if the applied another inconsistency analysis rule showed that there is an inconsistency, the method may comprise storing 122 a new inconsistency pattern together with the applied another inconsistency analysis rule, the new inconsistency pattern being associated with a certain value of a data attribute of the data post. Thus it may be possible to update the stored inconsistency patterns with a new inconsistency pattern that has occurred in the data repository.

According to still another embodiment, the method may comprise removing the inconsistency pattern of the number of inconsistency patterns that has found the least number of inconsistencies. Thereby, memory capacity of a pattern storage can be held free.

According to another embodiment, the method may comprise repeating 116 the method for a plurality of data posts in the data repository.

Figure 5:
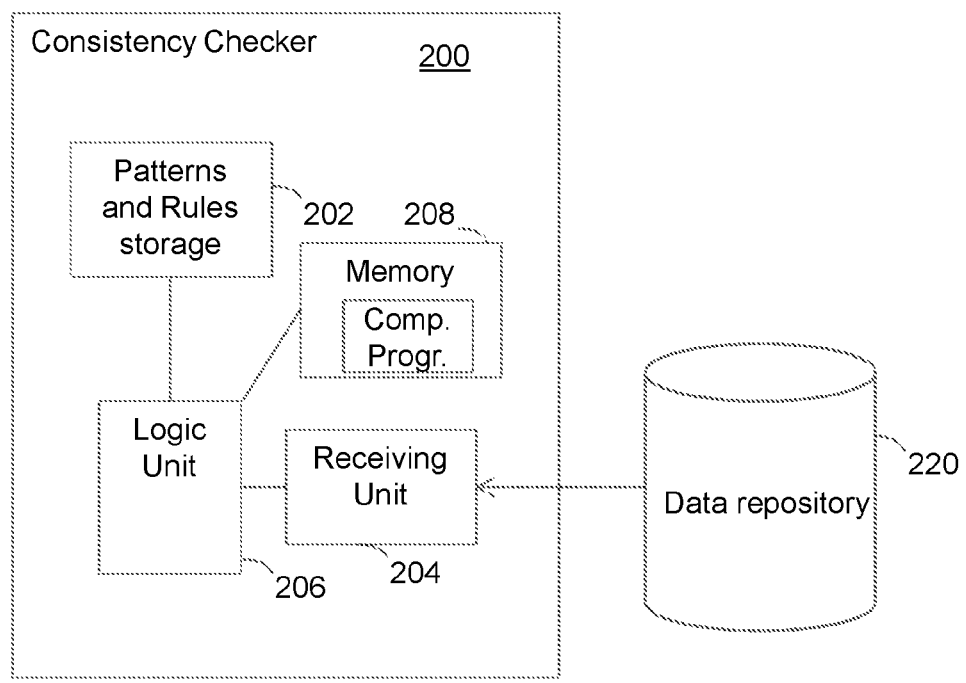
FIG. 5 is a block diagram illustrating a consistency checker apparatus according to some possible embodiments.

FIG. 5 shows a consistency checker 200 for finding inconsistencies of data posts stored in at least one data repository, according to an embodiment. The consistency checker may be a separate apparatus for finding inconsistencies in data repositories, separate from the data repository The consistency checker 200 comprises a storage for patterns and rules 202, in which inconsistency patterns and inconsistency analysis rules are stored. The rules and patterns are stored such that they are referenced to each other. The consistency checker further comprises a receiving unit 204 for receiving data from one or more data repositories 220. The receiving unit may also be arranged for fetching data from the data repository, i.e. not only passively receiving data but it may also more actively be fetching data from the repository 220. The receiving unit 204 is connected to a logic unit 206, which functions like a processor. The logic unit 206 controls the rest of the units and is arranged to perform different steps when an inconsistency analysis is performed. The logic unit is further connected to the patterns and rules storage 202.

The consistency checker may also comprise a memory 208 in which a computer program may be stored. The computer program may comprise computer readable code means, which when run in a computer, such as the logic unit 206 of the consistency checker, causes the computer to perform the corresponding method according to the invention. The memory 208 may be connected to the logic unit 206.

According to an embodiment, the consistency checker comprises a storage unit 202, in which a number of inconsistency patterns are stored, each inconsistency pattern being connected with an inconsistency analysis rule for a value of a data attribute, and a receiving unit 204 for receiving a data post from the data repository. The consistency checker further comprises a logic unit 206 arranged for matching a value of a data attribute of the data post with the value of the corresponding data attribute of at least one of the stored inconsistency patterns, and if there is a match, applying the inconsistency analysis rule that is connected with the matched inconsistency pattern to the data post to evaluate whether there is an inconsistency in the data post or not, wherein the number of inconsistency patterns each defines an inconsistency that has previously occurred for the value of the data attribute in the data repository.

According to another embodiment, each of the number of inconsistency patterns has a probability weight, which probability weight is based on a frequency that the inconsistency of the inconsistency pattern has occurred for data posts in the data repository. Further, the logic unit 206 is arranged for, if there is more than one match, selecting inconsistency pattern in an inconsistency pattern order according to the probability weight for each matched inconsistency pattern.

According to yet another embodiment, each of the number of inconsistency patterns has a probability weight, which probability weight is based on a frequency that the inconsistency of the inconsistency pattern has occurred for data posts in the data repository, Further, the logic unit 206 is arranged for, if the applied inconsistency analysis rule showed that there is an inconsistency for the data post, increasing the probability weight of the inconsistency pattern connected to the applied inconsistency analysis rule.

According to another embodiment, the logic unit 206 is further arranged for, if no match is found, applying another inconsistency analysis rule. Further, the logic unit 206 may be arranged for, if the applied another inconsistency analysis rule showed that there is an inconsistency, store a new inconsistency pattern together with the applied another inconsistency analysis rule, the new inconsistency pattern being associated with a certain value of a data attribute of the data post.

According to still another embodiment, the logic unit 206 is further arranged for removing the inconsistency pattern of the number of inconsistency patterns stored in the storage unit 202 that has found the least number of inconsistencies.

While the solution has been described with reference to specific exemplary embodiments, the description is generally only intended to illustrate the inventive concept and should not be taken as limiting the scope of the solution. The solution is defined by the appended claims.

The invention claimed is:

1. A method performed by a consistency checker for finding inconsistencies of data posts stored in a data repository, the consistency checker having access to a number of inconsistency patterns, each inconsistency pattern being associated with an inconsistency analysis rule for a value of a data attribute, the method comprising:
receiving a data post from the data repository;
matching a value of a data attribute of the data post with a value of a corresponding data attribute of the stored inconsistency patterns;
if there is a match, applying the inconsistency analysis rule that is connected with the matched inconsistency pattern to the data post to evaluate whether there is an inconsistency in the data post or not, wherein the number of inconsistency patterns each defines an inconsistency that has previously occurred for the value of the data attribute in the data repository,
wherein each of the number of inconsistency patterns has a probability weight, the probability weight indicating a frequency of inconsistency of each of the inconsistency patterns that occurred for the data posts in the data repository; and if there is more than one match, selecting inconsistency pattern in an inconsistency pattern order according to the probability weight for each matched inconsistency pattern.

2. The method of claim 1, further comprising:

if the applied inconsistency analysis rule showed that there is an inconsistency for the data post, increasing the probability weight of the inconsistency pattern connected to the applied inconsistency analysis rule.

3. The method of claim 1, further comprising:

if no match is found, applying another inconsistency analysis rule.

4. The method of claim 3, further comprising, if the applied another inconsistency analysis rule showed that there is an inconsistency, storing a new inconsistency pattern together with the applied another inconsistency analysis rule, the new inconsistency pattern being associated with a value of at least one data attribute of the data post.

5. The method of claim 1, further comprising repeating the method for a plurality of data posts in the data repository.

6. The method of claim 1, further comprising:

removing the inconsistency pattern of the number of inconsistency patterns that has found the least number of inconsistencies.

7. The method of claim 1, wherein if there is more than one match, the inconsistency pattern with highest probability weight is selected first.

8. A consistency checker for finding inconsistencies of data posts stored in at least one data repository, the consistency checker comprising:

a memory circuit in which a number of inconsistency patterns are stored, each inconsistency pattern being associated with an inconsistency analysis rule for a value of a data attribute;

a receiving circuit for receiving a data post from the data repository; and a logic circuit arranged for:

matching a value of at least one data attribute of the data post with a value of a corresponding data attribute of the stored inconsistency patterns;

if there is a match, applying the inconsistency analysis rule that is connected with the matched inconsistency pattern to the data post to evaluate whether there is an inconsistency in the data post or not, wherein the number of inconsistency patterns each defines an inconsistency that has previously occurred for the value of the data attribute in the data repository, wherein each of the number of inconsistency patterns has a probability weight, the probability weight indicating a frequency of inconsistency of each of the inconsistency patterns that occurred for the data posts in the data repository; and if there is more than one match, selecting inconsistency pattern in an inconsistency pattern order according to the probability weight for each matched inconsistency pattern.

9. The consistency checker of claim 8, wherein the logic circuit is further arranged for:

if the applied inconsistency analysis rule showed that there is an inconsistency for the data post, increasing the probability weight of the inconsistency pattern connected to the applied inconsistency analysis rule.

10. The consistency checker of claim 8, the logic circuit being further arranged for, if no match is found, applying another inconsistency analysis rule.

11. The consistency checker of claim 10, the logic circuit being further arranged for, if the applied another inconsistency analysis rule showed that there is an inconsistency, storing a new inconsistency pattern together with the applied another inconsistency analysis rule, the new inconsistency pattern being associated with a certain value of a data attribute of the data post.

12. The consistency checker of claim 8, the logic circuit being further arranged for removing the inconsistency pattern of the number of inconsistency patterns stored in a storage unit that has found the least number of inconsistencies.

13. The consistency checker of claim 8, wherein if there is more than one match, the inconsistency pattern with highest probability weight is selected first.

14. A non-transitory computer-readable medium comprising, stored thereupon, computer program code that, when run in a computer having access to a number of inconsistency patterns, each inconsistency pattern being associated with an inconsistency analysis rule for a value of a data attribute, causes the computer to find inconsistencies of data posts stored in a data repository by:

receiving a data post from the data repository;

matching a value of a data attribute of the data post with a value of a corresponding data attribute of the stored inconsistency patterns;

if there is a match, applying the inconsistency analysis rule that is connected with the matched inconsistency pattern to the data post to evaluate whether there is an inconsistency in the data post or not, wherein the number of inconsistency patterns each defines an inconsistency that has previously occurred for the value of the data attribute in the data repository, wherein each of the number of inconsistency patterns has a probability weight, the probability weight indicating a frequency of inconsistency of each of the inconsistency patterns that occurred for the data posts in the data repository; and if there is more than one match, selecting inconsistency pattern in an inconsistency pattern order according to the probability weight for each matched inconsistency pattern.

15. The non-transitory computer-readable medium of claim 14, wherein if there is more than one match, the inconsistency pattern with highest probability weight is selected first.

* * * * *